United States Patent [19]

Barrall et al.

[11] Patent Number: 4,569,878
[45] Date of Patent: Feb. 11, 1986

[54] LAMINATED COMPOSITES USING BONDING MATERIAL FROM REACTION OF METAL OXIDE, CALCIUM SILICATE AND PHOSPHORIC ACID

[75] Inventors: Jeffery L. Barrall, Lancaster; Ronald J. Leib, Manheim Township, Lancaster County; Debra L. Morris, Lancaster, all of Pa.

[73] Assignee: Armstrong World Industries, Inc., Lancaster, Pa.

[21] Appl. No.: 714,855

[22] Filed: Mar. 22, 1985

Related U.S. Application Data

[63] Continuation-in-part of Ser. No. 588,577, Mar. 12, 1984.

[51] Int. Cl.⁴ ............................................. B32B 9/06
[52] U.S. Cl. .................................... 428/182; 156/325; 428/186; 428/196; 428/251; 428/285; 428/286; 428/317.5; 428/334; 428/449; 428/454; 428/537.5; 428/702; 428/704; 428/921

[58] Field of Search ............... 428/448, 921, 449, 704, 428/182, 186, 196, 251, 285, 286, 317.5, 334, 454, 537.5, 702; 156/325

[56] References Cited

U.S. PATENT DOCUMENTS 4,375,516  5/1982  Barrall .................................. 501/84

Primary Examiner—Marion C. McCamish
Attorney, Agent, or Firm—Laird F. Miller

[57] ABSTRACT

The present invention relates to laminated materials which are constructed using layers of reinforcing and/or non-reinforcing materials in combination with layers of a composition which is known in the art to provide water-resistant phosphate ceramic materials. In a preferred embodiment, the products are fire-resistant and intumescent when exposed to heat or direct flame, and they produce little or no smoke. Nevertheless, these products are tough, durable and suitable to provide a decorative and pleasing appearance.

38 Claims, 4 Drawing Figures

LAMINATED COMPOSITES USING BONDING MATERIAL FROM REACTION OF METAL OXIDE, CALCIUM SILICATE AND PHOSPHORIC ACID

This is a continuation-in-part of copending application Ser. No. 588,577, filed Mar. 12, 1984.

The present invention relates to laminated composites and more particularly to laminated composites which are useful as partitions, walls, decorative surfaces, and the like.

BACKGROUND OF THE INVENTION

The construction of laminated sheet materials has received extensive study by industry. In particular, materials have been sought which are light in weight, have good appearance, are rugged and durable, and are fireproof or fire-resistant. The latter attributes, in particular, have received special attention. Interior surfaces in buildings, aircraft, automobiles, and the like, are often made of organic materials. When such materials are exposed to heat or fire, toxic fumes are given off and, in many instances, these fumes lead to asphyxiation or result in severe lung damage to those persons who are exposed to the fumes. Accordingly, industry has spent a substantial amount of time and effort in attempting to develop products which will have all of the aforementioned attributes, yet which will give off no toxic fumes when subjected to fire.

THE PRIOR ART

A number of references are found in the prior art which deal with ways in which fire-resistant products can be produced. For example, U.S. Pat. No. 2,744,589 discloses wall panel units which comprise an insulated panel whereby the core is doubly insulated. The insulating materials are indicated to be rock-wool materials and gypsum sheet. Similarly, U.S. Pat. No. 3,466,222 discloses a combination of materials which by themselves would be unsuitable for use as fire retardants; however, in combination, they are capable of forming laminated materials which are stated to be fire-resistant.

Recently, U.S. Pat. No. 4,375,516 disclosed rigid, water-resistant phosphate ceramic materials and processes for preparing them. Both foamed and unfoamed materials can be produced according to procedures set forth in this patent, and the products which have been produced are remarkably suitable for use as wall boards, ceiling boards, and the like. Further, these products are fire-resistant because they can be produced as totally or primarily inorganic compositions. Nevertheless, the products produced as indicated in the reference are not entirely satisfactory for all uses because they are rigid in nature. That is, rather than bending under stress, the boards tend to break.

Accordingly, one objective of the present invention is to provide inorganic boards which can be flexible in nature, yet which are strong and durable.

Another objective of the present invention is to provide fire-resistant boards which are intumescent when subjected to heat or fire, and which produce little or no smoke and fumes.

Another objective of the present invention is to provide inorganic laminates which are flexible even though they are constructed using materials that are disclosed in the art as being suitable to provide rigid products.

These and other advantages of the present invention will become apparent from the detailed description of preferred embodiments which follow.

SUMMARY OF THE INVENTION

The present invention relates to laminated materials which are constructed using layers of reinforcing and/or non-reinforcing materials in combination with layers of a composition which is known in the art to provide water-resistant phosphate ceramic materials. In a preferred embodiment, the products are fire-resistant and intumescent when exposed to heat or direct flame, and they produce little or no smoke. Nevertheless, these products are tough, durable and suitable to provide a decorative and pleasing appearance.

DETAILED DESCRIPTION OF THE PREFERRED EMBODIMENT

Figure 1:
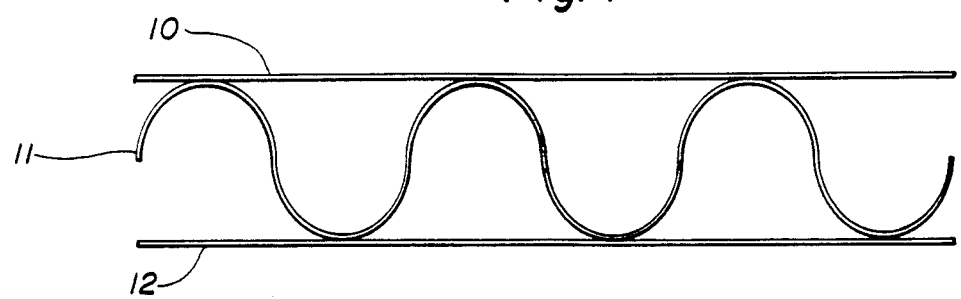

In one embodiment, the present invention relates to a bonded composite structure comprising at least one layer of at least one type of layer material, each said layer of layer material being bonded to contiguous layers of layer material by a water-resistant phosphate bonding material obtained from the reaction of a composition comprising a metal oxide, calcium silicate and phosphoric acid.

In a second embodiment, the present invention relates to a fire-resistant bonded composite comprising a plurality of layers of at least one type of layer material, and a plurality of layers of a water-resistant phosphate bonding material obtained from the reaction of a composition comprising a metal oxide, calcium silicate and phosphoric acid, each said layer of layer material being bonded to contiguous layers of layer material by said bonding material, said bonded composite being capable of exhibiting intumescent properties when exposed to flame and/or heat.

In a third embodiment, the present invention relates to a process for forming a bonded composite structure, said process comprising the steps of preparing a layered composition comprising at least one layer of a phosphate bonding composition comprising a metal oxide, calcium silicate and phosphoric acid, said composition being suitable to provide a water-resistant phosphate bonding material, and at least one layer of at least one type of layer material, said composite being arranged such that contiguous layers of said layer material are in contact with intervening layers of said bonding composition, and curing said layered composition, optionally by subjecting it to heat and/or pressure.

The unique characteristics of the products which may be produced according to the present invention are attributable in significant part to the use of a phosphate bonding composition which is suitable to provide a water-resistant phosphate ceramic material. Such materials are presently taught in the art to be suitable to provide rigid foamed and unfoamed phosphate ceramic products. Surprisingly, however, it has been discovered that, when such compositions are applied as relatively thin bonding layers, they are useful to provide laminated structures which are highly flexible. Examples of compositions which are suitable to achieve this result include those disclosed in U.S. Pat. No. 4,375,516. That patent disclosed that compositions comprising calcium silicate, phosphoric acid and a metal oxide selected from the group consisting of aluminum oxide, magnesium oxide, calcium oxide and zinc oxide, and the hydrates thereof, could be reacted to provide water-resistant phosphate materials; however, it has now been discovered that other metal oxides can also provide water-resistant phosphate materials. Accordingly, the present invention contemplates all compositions comprising a metal oxide, calcium silicate and phosphoric acid, provided that these compositions react to provide a water-resistant material. It will also be understood that more than one bonding formulation may be used in a multi-layer structure.

These compositions are coated, preferably in relatively thin layers on the order of ca. 1-20 mils thick, onto the surface of a layer material which may be a reinforcing or a non-reinforcing material. The compositions may be applied at normal consistency, or they may be applied as mechanically frothed foams. Where very thin coatings are desired or where lighter-weight laminates are desired, the latter technique is preferred because the foam may be applied at a thickness of ca. 1 mil, after which the thickness is reduced to a thinner dimension as the foam collapses. As yet another alternative, the bonding composition may be applied in a discontinuous manner to portions of the layer material. Accordingly, the term "layer" of bonding material is intended to encompass applications in which this material is deposited in a uniform and also a non-uniform manner.

After applying the bonding composition, the coated material may then be allowed to cure, or it may be covered with a second layer of the same or a different layer material and then allowed to cure. Curing may be achieved under ambient conditions; however, where more dense products are desired, curing may be effected under pressure. In addition, moist or dry heat may also be applied during curing to accelerate the curing process.

A variety of materials may be used to provide laminates as disclosed herein. For example, kraft paper, paper towel, cheese cloth, woven and non-woven glass mats, woven and non-woven synthetic materials such as polyester, nylon, and the like, chopped fibers of various materials, mineral wool, wire mesh and other well-known materials may be used alone or in combination as layer materials. In addition, non-reinforcing materials such as cementitious materials and the like may also be used although, in most instances, these will lead to products which are rigid in character.

Particularly effective reinforcing materials for use in combination with the phosphate bonding materials disclosed herein are materials which are disclosed in co-pending U.S. application Ser. No. 588,576, and also in U.S. Pat. No. 4,239,519 and patents related thereto, the contents of which are incorporated herein by reference. These references, when considered collectively, disclose a class of material which is referred to herein as "synthetic mica" materials. In essence, they are non-asbestos papers or sheets which are derived from silicate gels by cation exchange reactions. Materials of this type are known to be relatively unaffected by high temperatures, yet they tend to have good flexibility.

Laminated structures comprising layers of the phosphate bonding materials and synthetic mica sheets have shown remarkable characteristics. For example, when such composites were exposed to direct flame, they have not only been shown to be fire-resistant and relatively smoke-free, but they have also demonstrated intumescent properties. That is, the exposure of one surface of the structure to direct flame has been observed to cause an apparent internal delamination of the structure, resulting in the production of air spaces. Such air spaces have been shown to be insulative in nature, and dramatic heat differentials have been noted between two sides of a structure tested in this manner. For example, although one side of a relatively thin structure on the order of 0.06 in. in thickness was exposed to direct flame at a temperature of about 2050° F. for 1 minute, internal swelling occurred and the temperature on the opposite side of the structure was less than 600° F.

This phenomenon is not restricted to laminates constructed using synthetic mica materials. For example, laminates comprising kraft paper also exhibit intumescent properties, and large temperature differentials have been noted for these laminates when tested as described above. The reason why delamination occurs is not clearly understood, although it is believed to be associated at least in part with water contained within the structure.

In addition to intumescent laminates, heat conducting laminates can also be produced by including wire screen as one of the layers. Laminates of this type have been quite effective in conducting heat away from the point of application; thus, these materials can be useful as heat-conducting gaskets, and the like.

The thickness of the laminates produced according to the present invention can be highly variable. At the desire of the artisan, structure thickness may be varied from very thin (e.g., 0.03 in.) to very thick (e.g., 0.5 in. or more). Laminated structures have been produced comprising as few as one layer of one reinforcing material and one layer of phosphate bonding material, or as many as 37 layers of reinforcing layers and 36 layers of phosphate bonding material. This illustration, however, is not intended to limit the number of layers which could be included in a laminate. Furthermore, there is no necessity to restrict the reinforcing materials used in making the laminated structure to a single type, and combinations of reinforcing materials may be used to advantage.

Figure 2:
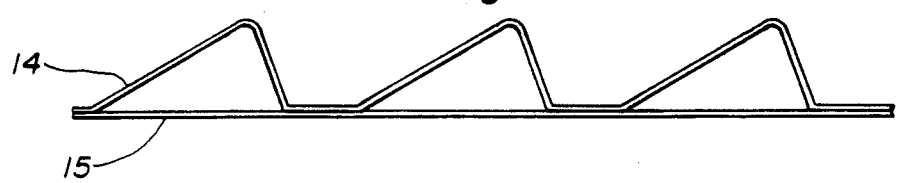

It will also be recognized that the various layer materials need not be used in a planar configuration, FIGS. 1-4. For example, one or more layers of material may be preformed as taught herein into three-dimensional configurations having regularly or irregularly spaced fluting. Examples of such configurations are corrugated structures as disclosed by layer 11 of FIG. 1, and angularly fluted structures as disclosed by layer 14 of FIG. 2. Such layers may be used as is, or they may be incorporated into more complex laminated structures as seen in FIGS. 1 and 2 wherein the non-planar layers can serve as reinforcing layers. In addition, tubular structures, honeycomb structures, and a variety of other three-dimensional structures may be prepared using the lamination procedures disclosed herein.

The advantages of the present invention will become more apparent by reference to the following examples which are intended by way of illustration, and not limitation.

EXAMPLES

EXAMPLE 1

A phosphate bonding material was prepared from the following ingredients:

| Components | Weight (grams) |
| --- | --- |
| Al$_2$O$_3$.3H$_2$O | 15.0 |
| MgO | 8.0 |
| Talc | 16.0 |
| 75% H$_3$PO$_4$ (53.0% P$_2$O$_5$) | 105.0 |
| H$_3$BO$_3$ | 4.0 |
| CaSiO$_3$ | 100.0 |
| H$_2$O | 18.0 |

A phosphate bonding material was produced by preparing a reaction solution comprising the phosphoric acid, the aluminum oxide, and the water. After a clear solution was obtained, and while the solution was still hot, the boric acid was added and the mixture was stirred until it again became clear. The reaction solution was cooled to 4° C. and a mixture of the dry components was added.

Each of five two-ply layers of Reichhold Modiglass 2.5X-SM scrim measuring 3 in. ×12 in. was rapidly provided with 3-mil draw downs of the above formula. The five layers were immediately stacked and pressed together for 25 second under 556 psi pressure in a press heated to 250° F. The resulting sheet was strong and water resistant, yet flexible.

The MOR of the laminate, measured essentially according to ASTM D-1037, was 2,100 psi; the MOE value was calculated to be 621 ksi; and the NBS fire rating was 0 for smoldering and 2 for flaming, measured essentially according to ASTM E-662-79.

EXAMPLE 2

The process as set forth in Example 1 was repeated, except that the press was equipped on one face with an embossing plate. The resulting sample picked up the very fine details of the embossing plate.

EXAMPLE 3

A 1-mil draw down of a phosphate bonding material having the formula set forth in Example 1 was made onto each of ten separate sheets of kraft paper having dimensions of 12 in. ×12 in. ×0.012 in. The ten sheets were immediately stacked together and pressed for 1 minute under 560 psi pressure in a press heated at 200° F. The resulting sample was strong and flexible, although it was not as flexible as the glass reinforced structure set forth in Example 1. Its MOR value, measured as described in Example 1, was 4,500 psi.

The bonded composite structure was cut into 4 in. ×4 in. pieces and two of the pieces were selected at random for testing. Each piece was placed horizontally on a ring stand and a thermocouple was placed at a location on the bottom surface where the point of the blue propane flame was to be applied. A second thermocouple was placed on the top surface of the laminate directly above the first thermocouple. When the flame was applied, the temperatures at both thermocouples were recorded with time. Sample 3A increased in thickness from 0.085 in. to 0.199 in. when heated for 7 minutes. At the end of that time period, the thermocouple on the flame side of the face measured a temperature of 1893° F. whereas the temperature on the top side was measured to be 622.5° F. Sample 3B was heated for 6 minutes and showed an increase in thickness from 0.085 in. to 0.166 in., and temperature readings of 1844° F. and 713° F. on the flame side and top side, respectively, were recorded.

EXAMPLE 4

A phosphate bonding material as set forth in Example 1 was prepared, except that it comprised 50% by weight of colored No. 17 silica granules from Ottawa Silica Company. This was achieved by mixing the granules with the dry components and then preparing the phosphate bonding material. The filled bonding material was drawn down in a 3-mil layer onto one sheet of Johns-Manville glass paper and, at the same time, 3-mil draw downs were also prepared on three separate 3-ply sheets of the Modiglass scrim described in Example 1. The three Modiglass layers were stacked on top of one another and the Johns-Manville glass paper was placed on the top of the stack with the granule-filled bonding material facing up. The stacked material was then pressed under 556 psi pressure at 220° F. for two minutes to give a flexible sheet with good scratch resistance.

EXAMPLE 5

The procedure as set forth in Example 4 was repeated except that the press was equipped on one face with an embossing plate. The resulting product exhibited fine detail from the embossing plate.

EXAMPLE 6

A 12-mil draw down of the phosphate bonding materials set forth in Example 1 was applied to three pieces of kraft paper having a dimension of 12 in. ×12 in. The sheets were stacked (bonding layer up) and a fourth sheet was placed on top of the stack. The stack was immediately placed in a mated 12-in. ×12-in. ×⅝-in. mold having a corrugated pattern as illustrated by layer 11 of FIG. 1 and subjected to ca. 200 psi pressure at 180° F. for one minute. The resulting product had a corrugated pattern.

EXAMPLE 7

The corrugated product of Example 6 was interfaced with two 4-sheet laminates prepared as described in Example 2. Each of the laminates had been precoated with a 10-mil layer of bonding material and the sheets were interfaced such that the bonding layer contacted the upper or lower peaks of the corrugated sheet. The composite was immediately placed in a press heated to 180° F. and subjected to ca. 5 psi pressure for 1 minute. The laminated composite had the structure shown in FIG. 1 wherein upper laminate 10 and lower laminate 12 are bonded to corrugated layer 11 at the points where the peaks of the corrugations contact the respective sheets. The MOR of this material was 3,000 psi, as measured essentially according to ASTM D-1037.

EXAMPLE 8

Two corrugated sheets were formed as described in Example 6 and one of the sheets was treated on one side such that the peaks of the corrugation were coated with 10 mils of bonding material. The two sheets were then interfaced such that the grooves of the respective sheets were at right angles to one another, and the composite was subjected to heat and pressure for two minutes as described in Example 7. The resulting rigid structure had an MOR of 1700 psi.

EXAMPLE 9

A phosphate bonding material was prepared comprising the following components:

| Components | Weight (grams) |
| --- | --- |
| $Al_2O_3.3H_2O$ | 18.0 |
| MgO | 8.0 |
| Talc | 16.0 |
| 75% $H_3PO_4$ (53.0% $P_2O_5$) | 108.0 |
| $H_3BO_3$ | 4.0 |
| $CaSiO_3$ | 100.0 |
| $H_2O$ | 18.0 |

The reaction solution was prepared by mixing the phosphoric acid, the water, and the aluminum oxide trihydrate and stirring until a clear solution was obtained. The boric acid was added to the resulting warm solution and stirred. After this solution had become clear, the reaction solution was chilled to about 35-39° F.

To the 148 grams of cold liquid was added, with vigorous stirring, the 124 grams of dry components which had been mixed to provide a uniform material. The resulting mixture was stirred until it had become homogeneous, and it was then placed in an ice bath to prolong the liquid consistency; i.e., to delay the interaction of the components. The pot life of this material could be varied from about 30 seconds to about 7 minutes, depending on the capability of controlling the exothermic reaction temperature in the ice bath.

A synthetic mica sheet was prepared from the following components essentially as described in the aforementioned copending application:

| Component | Weight (grams) |
| --- | --- |
| Magnesium fluorhectorite | 100.0 |
| Bleached redwood cellulose | 10.0 |
| ¼" DE glass fibers | 5.0 |
| Polymin P flocculating agent | 0.075 |
| Hydraid 777 flocculating agent | 0.037 |
| Water | — |

The bleached redwood cellulose was dispersed in water by means of a hydropulper and was refined in a Jordan Refiner until a consistency of 500 (Canadian Freeness) was obtained. The refined pulp was transferred to a large, open-head tank and was slurried with the glass fibers. After charging the required amount of water into the tank to get a consistency of 1.3% solids, the magnesium fluorhectorite floc was added and the mixture was stirred until it was homogeneous. The Polymin P and Hydraid 777 were then added and the composition was immediately flowed onto the forming screen of a Fourdrinier machine. After removing most of the water, the mat was subjected to vacuum in a series of vacuum presses. Residual water was then removed by passing the synthetic mica mat over a heated drum.

A thin coating of the above phosphate bonding material (I) was brushed at an approximate thickness of 10 mils onto the surface of a synthetic mica sheet (S). A piece of microlith glass sheet (G), designated SH20/1 from Glaswerk Schuller GmbH, was immediately placed in the bonding material and saturated, and a second synthetic mica sheet was placed on top of the glass layer. The assembled materials were placed in a press between glass surfaces and pressed under 250 psi pressure for five minutes at 170° F. After pressing was complete, the pressed composite was conditioned at 170° F. for several additional minutes to remove water, giving a product which was strong and flexible.

It is noted that, due to the porous nature of the glass sheet, the bonding material did not have to be applied on both sides of the glass sheet. The bonding material was capable of passing through (saturating) the glass layer under pressure such that both contiguous layers of synthetic mica could be bonded to the glass through a single application of bonding material. In this, and the following examples, the saturation is indicated by (GI) or (IG). Accordingly, the structure of this example had the laminar order S(IG)S.

EXAMPLE 10

A process similar to that of Example 9 was repeated except that glass sheets constituted the exterior layers and the composite material had the structure (GI)S(IG). The glass sheets were bonded with the phosphate bonding material to the single internal layer of synthetic mica sheet by placing the composite in a press that was equipped with shallowly patterned embossing plates. The plates provided a fine texture in a desired design to the surface of the laminate.

EXAMPLE 11

The procedure of Example 10 was repeated, except that the composite material was placed between a foamed silicone rubber pad and male or female metal molds bearing a design. This resulted in the production of molded products with deeply embossed images.

EXAMPLE 12

A series of laminates was prepared essentially as described in Example 9, each sample containing synthetic mica, phosphate bonding material, and, optionally, glass sheet. As in Example 9, the phosphate binder saturated the glass sheet such that, when included internally in a laminated structure, the binder served to bond contiguous layers of synthetic mica even though the binder may have been applied to only one face of the glass sheet, or to only one of the contiguous synthetic mica sheets.

Modulus of rupture (MOR) values were determined according to ASTM D-1037 whereas modulus of elasticity (MOE) values were calculated by standard mathematical means from the MOR values. The structures of each laminate are indicated, top to bottom. Unless otherwise indicated, the bonding material was applied in 8-mil draw downs, and SH 20/1 glass sheet was used.

| Sample | Structure | MOR(psi) | MOE(ksi) |
| --- | --- | --- | --- |
| 12A | SISISIS | 1448 | 164 |
| 12B | S(IG)S(IG)S(IG)S | 1568 | 175 |
| 12C* | S(IG)S(IG)S(IG)S | 1682 | 211 |
| 12D | (GI)S(IG)S(IG)S(IG)S(IG) | 3449 | 576 |

* = I applied as a 12-mil draw down

The results for these samples show a marked increase in strength when the laminate is faced with the glass sheet.

| Sample | Structure | MOR(psi) | MOE(ksi) |
| --- | --- | --- | --- |
| 12E | (GI)SISISIS(IG) | 3214 | 588 |
| 12F** | (GI)SISISIS(IG) | 3906 | 568 |

-continued

| Sample | Structure | MOR(psi) | MOE(ksi) |
|---|---|---|---|
| 12G | (GI)SISIS(IG) | 3247 | 610 |
| 12H | (GI)SIS(IG) | 3500 | 582 |

** = SH 50/1 glass sheet used in place of SH 20/1 glass sheet.

These results, when compared to the values obtained for sample 12D, suggest that the facing scrim sheets contribute substantially more to the strength of the laminate than do the internal glass sheets.

| 12I | SISIS | 1713 | 323 |
|---|---|---|---|
| 12J | S(IG)S(IG)S | 2320 | 385 |
| 12K | IS(IG)S(IG)SI | 2355 | 471 |

These data are provided for comparison.

EXAMPLE 13

This example will illustrate the results when various samples were heated with a propane torch as described in Example 3. The results are indicated below for laminates having various components and structural arrangements.

Heating caused noticeable changes to the laminates, and these changes became more pronounced as the number of layers increased. For example, when heat was applied to a single synthetic mica sheet, only a small expansion of the sheet was seen. However, when two or more synthetic mica and phosphate bonding layers (with or without glass reinforcing) were utilized, blistering became more pronounced. The effect with the thicker samples, as shown below, was to provide good insulative effects. The table indicates the increase in thickness which was induced in each sample by the heating.

Samples were constructed of layers of SH 20/1 glass sheet and/or synthetic mica bonded together with phosphate bonding material substantially as described in Example 12. The resulting laminates were unembossed. They were designated as Samples 13A through 13H and the "Structure" column lists the laminar sequence from top to bottom.

| | | Thickness Change (inch) | | |
|---|---|---|---|---|
| Sample | Structure | Initial | Final | Increase |
| 13A | S | 0.027 | 0.038 | 0.011 |
| 13B | ISI | 0.034 | 0.125 | 0.091 |
| 13C | (GI)S(IG) | 0.037 | 0.130 | 0.093 |
| 13D | ISISI | 0.055 | 0.150 | 0.095 |
| 13E | (GI)S(GI)S(IG) | 0.063 | 0.173 | 0.110 |
| 13F | ISISISI | 0.073 | 0.194 | 0.121 |
| 13G | (GI)S(GI)SIS(IG) | 0.085 | 0.210 | 0.125 |
| 13H | (GI)S(GI)S(GI)S | 0.084 | 0.250 | 0.166 |

Temperature differentials were as follows, measured at the indicated time intervals. Measurements were made by subtracting the temperature at the top-side thermocouple (Ts) from the flame-side thermocouple (Fs) to obtain the differential (D).

| | | Temperatures (°F.) as Indicated Time Intervals (seconds) | | | | |
|---|---|---|---|---|---|---|
| Sample | Location | 15 | 30 | 60 | 120 | 180 |
| 13A | Fs | 2163 | 2180 | 2196 | — | — |
| | Ts | 1017 | 1090 | 1107 | — | — |
| | D | 1146 | 1090 | 1089 | — | — |
| 13B | Fs | 2195 | 2222 | 2239 | — | — |
| | Ts | 855 | 1032 | 1024 | — | — |
| | D | 1340 | 1190 | 1215 | — | — |
| 13C | Fs | 2275 | 2329 | 2314 | 2291 | 2304 |
| | Ts | 454 | 1064 | 1064 | 1074 | 1068 |
| | D | 1821 | 1254 | 1254 | 1217 | 1236 |
| 13D | Fs | 1862 | 1997 | 2016 | 2038 | 2059 |
| | Ts | 183 | 344 | 794 | 866 | 869 |
| | D | 1679 | 1653 | 1222 | 1172 | 1190 |
| 13E | Fs | 1897 | 2042 | 2043 | 2072 | 2079 |
| | Ts | 160 | 237 | 552 | 736 | 756 |
| | D | 1737 | 1805 | 1491 | 1336 | 1323 |
| 13F | Fs | 2060 | 2106 | 2162 | 2192 | 2175 |
| | Ts | 179 | 199 | 365 | 714 | 726 |
| | D | 1881 | 1907 | 1797 | 1478 | 1449 |
| 13G | Fs | 2182 | 2219 | 2216 | 2253 | 2262 |
| | Ts | 169 | 182 | 281 | 658 | 687 |
| | D | 2013 | 2037 | 1935 | 1595 | 1575 |
| 13H | Fs | 2051 | 2029 | 2073 | 2149 | 2166 |
| | Ts | 158 | 176 | 221 | 584 | 622 |
| | D | 1893 | 1853 | 1852 | 1565 | 1504 |

These results illustrate that heating causes the laminates to swell, thereby exhibiting intumescent properties.

EXAMPLE 14

The procedure as set forth in Example 9 was repeated using synthetic mica, Schuller 20/1 glass scrim, Burlington #1653 Lenoweave (16×8) glass scrim (abbreviated "B") and/or galvanized iron wire window screen (W) having 14 strands v. 17 strands per square inch. The following samples were prepared:

| Sample | Structure |
|---|---|
| 14A | SIS |
| 14B | ISI |
| 14C | S(IG)S |
| 14D | (GI)S(IG) |
| 14E | S(IB)S |
| 14F | S(IW)S |

The products were tested for tensile strength and also for flexibility. Tensile strengths were determined essentially according to ASTM F-152 using Type 1 specimen sizes on an Instron tensile tester at 1 in./min crosshead speed and a chart speed of 1 in./min; however, the samples were not preconditioned. The samples were cut in a ½-inch dumbbell shape, with the exception of sample 14F which was cut in a 1-in. dumbbell shape. The following results were obtained:

| | Results | | | |
|---|---|---|---|---|
| Sample | Lbs. @ break | | psi | |
| 14A | 24.7 | (1.5) | 1030 | (106) |
| 14B | 11.6 | (2.4) | 777 | (282) |
| 14C | 30.0 | (3.7) | 1280 | (240) |
| 14D | 24.5 | (1.8) | 1210 | (180) |
| 14E | 45.1 | (2.3) | 1880 | (180) |
| 14F | 146 | (11) | 5830 | (170) |

The values reported are an average of three measurements, with the numbers in parentheses being the difference between the highest and lowest numbers recorded for each set.

Flexibility was determined essentially according to ASTM F-147, commonly referred to as a "mandrel bend test." Samples 14A-14D failed the test using a 1-in. mandrel; sample 14F passed using a 1-in. mandrel; and sample 14E passed using a ⅜in. mandrel. None of the samples was preconditioned.

EXAMPLE 15

This example will illustrate the heat conductive results which can be obtained by including a metal screen in a laminate. Laminate C, having the structure (GI)S(-WI)S, was prepared in the usual manner, except that thermocouples were incorporated into the structure by placing them on the upper surface of the upper synthetic mica sheet. They were then cured in place by applying the upper (GI) layers. The thermocouples were located at measured distances from the point of flame application either in the wire directon (WD) or

| Thermocouple | Location | Distance |
|---|---|---|
| TC 1 | flame application point | — |
| TC 2 | oblique | 2" |
| TC 3 | oblique | 4" |
| TC 4 | oblique | 5" |
| TC 5 | oblique | 6" |
| TC 6 | WD | 4" |

Laminate C was prepared using galvanized iron wire as described in Example 14 whereas Laminate B was prepared to contain comparable copper wire. Laminate A, which contained no wire, was prepared as a control. The following temperatures were recorded.

| Time (Min.) | TC 1 | | | TC 2 | | | TC 3 | | | TC 4 | | | TC 5 | | | TC 6 | | |
|---|---|---|---|---|---|---|---|---|---|---|---|---|---|---|---|---|---|---|
| | A | B | C | A | B | C | A | B | C | A | B | C | A | B | C | A | B | C |
| 0 | 80 | 80 | 78 | 81 | 80 | 78 | 81 | 80 | 79 | 81 | 81 | 79 | 81 | 81 | 79 | 81 | 80 | 78 |
| 3 | 1989 | 1892 | 1911 | 166 | 191 | 210 | 99 | 101 | 96 | 94 | 95 | 89 | 90 | 92 | 86 | 116 | 156 | 144 |
| 10 | 1920 | 1865 | 1919 | 161 | 219 | 255 | 100 | 108 | 108 | 95 | 99 | 96 | 91 | 94 | 91 | 116 | 163 | 168 |
| 15 | 1861 | 1877 | 1871 | 200 | 237 | 261 | 102 | 110 | 111 | 96 | 100 | 98 | 92 | 95 | 93 | 121 | 172 | 169 |

These results indicate that a laminated screen will assist in dissipating the heat from the point of application, and that copper wire will dissipate the heat more effficiently than will galvanized iron wire. In addition, by comparing the results for TC5 and TC6, it is seen that heat is more efficiently conducted in a

EXAMPLE 16

This example will illustrate the preparation of a sample which is not cured under heat and pressure. A 6-mil coating of the bonding composition described in Example 1 (about 125g) was applied to a 12 in. ×12 in. piece of 2.5X-SM Modiglass scrim, and a second piece of scrim was placed on top of the coating. The layered material was briefly compressed to drive the bonding composition into the respective scrim layers and the composite was allowed to cure under ambient conditions. Curing was effected in about 5 minutes.

EXAMPLE 17

This example will illustrate the application of a foamed bonding composition to a layer of scrim. The bonding composition was prepared as described in Example 1 and mixed for about 25 seconds. To the mixed material (268g) was added 10.1 g (3.8%) of Millifoam surfactant from Onyx Chemical Co. and the foam was produced by mechanically mixing with an air stirrer for 40 seconds. A 3-mil coating was applied to both surfaces of a 12 in. ×12 in. piece of 7.5X-SM Modiglass scrim, the total application by weight being about 82g. The coated scrim was pressed for 25 seconds at 180° F. to give a cured sheet.

EXAMPLE 18

A planar structure was prepared as described in Example 10 by coating a synthetic mica sheet on both sides with 12 mils of phosphate bonding material and facing the coated sheet with glass sheets. In addition, a fluted composite layer as illustrated by layer 14 in FIG. 2 was prepared by using the same components, but by putting the composite in a mold having the appropriate fluted configuration. Finally, a 12-mil layer of phosphate bonding material was applied to the planar bottom side of the fluted composite such that, when the planar structure prepared above was contacted with the fluted layer and cured at 180° F. under 250 psi pressure for 3 minutes, a sandwich structure was formed. This structure, which is illustrated in FIG. 2, has layer 15 attached to the bottom side of the sheet by the bonding material. This structure had an MOR of 420 psi when measured according to the standard procedure.

EXAMPLE 19

Figure 3:
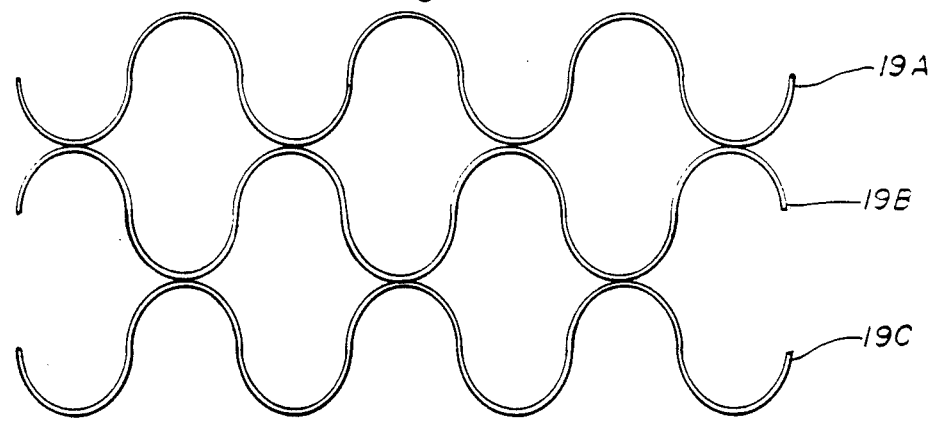
Figure 4:
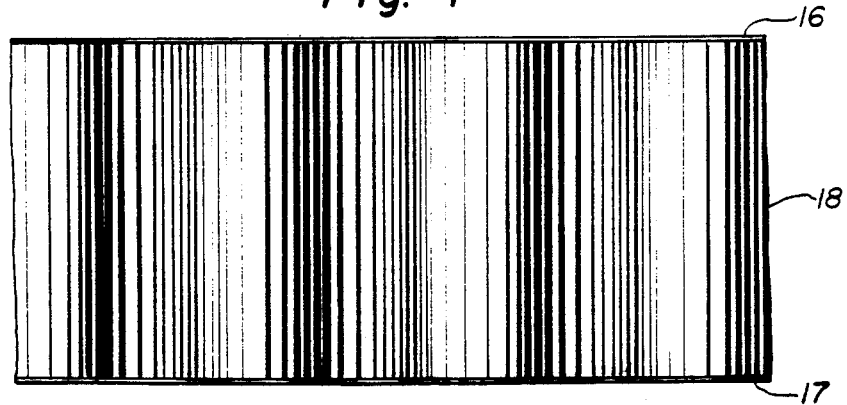

A honeycomb product was prepared by producing several corrugated synthetic mica strips or sheets having the appearance of layer 11 of FIG. 1, but using substantially the components of Sample 13B. Three corrugated layers (19A, B, and C) were selected and the middle layer (19B) was coated along its top and bottom peaks such that, when interfaced with layers 19A and 19C as shown in FIG. 3, these layers, after curing, were bonded together. Where strips were used, the laminated materials were turned on edge and bonded to facing layers of synthetic mica materials to provide structures shown in FIG. 4. In this figure, 16 and 17 are the top and bottom layers, and 18 is the honeycomb. Where sheet materials were used, structures comparable to those shown in FIG. 4 could be prepared by sawing the sheets into strips, and then attaching them to layers 16 and 17 as described above.

It is also noted that honeycomb structures could be prepared in a manner corresponding to the techniques used to prepare conventional honeycombs; i.e., a plurality of sheets could be bonded together at selected locations such that, when the layers were expanded, a honeycomb structure would be obtained.

EXAMPLE 20

A tubular structure was prepared by interfacing an uncured composite of glass, 12 mils of phosphate bonding material and synthetic mica such that the composite had the structure (GI)S. The sheet was immediately wound onto a 2-in. mandrel coated with a Teflon/glass cloth sleeve such that 4 plys were wrapped around the mandrel. A wet cloth was placed around the wound sheet and, as the mandrel was turned on a lathe, it was wrapped with a wet, 2.5-in. wide woven nylon strip, the strip being provided to exert pressure on the underlying material. The assembly was cured at 300° F. for 30 minutes, after which the nylon and cloth were removed, and the cured material was removed from the mandrel to yield a rigid tube.

The present invention is not restricted solely to the descriptions and illustrations provided above, but encompasses all modifications envisaged by the following claims.

What is claimed is:

1. A bonded composite structure comprising at least one layer of at least one type of layer material, each said layer of layer material being bonded to contiguous layers of layer material by at least one type of water-resistant phosphate bonding material obtained from the reaction of a composition comprising a metal oxide, calcium silicate and phosphoric acid.

2. The structure as set forth in claim 1 hereof wherein said metal oxide is selected from the group consisting of aluminum oxide, magnesium oxide, calcium oxide and zinc oxide, and the hydrates thereof.

3. The structure as set forth in claim 2 hereof wherein said bonding composition comprises a substantially uniform layer of material.

4. The structure as set forth in claim 2 hereof wherein said bonding composition comprises a substantially discontinuous layer of material.

5. The structure as set forth in claim 2 hereof wherein said bonded composite comprises a synthetic mica layer material.

6. The structure as set forth in claim 2 hereof wherein said bonded composite comprises a woven, a non-woven or a chopped glass layer material.

7. The structure as set forth in claim 2 hereof wherein said bonded composite comprises a woven, a non-woven or a chopped synthetic layer material.

8. The structure as set forth in claim 2 hereof wherein said bonded composite comprises a kraft paper layer material.

9. The structure as set forth in claim 2 hereof wherein said bonded composite comprises a wire mesh layer material.

10. The structure as set forth in claim 1 hereof wherein said bonding composition comprises aluminum oxide trihydrate.

11. The structure as set forth in claim 1 hereof wherein said bonding composition comprises magnesium oxide.

12. The structure as set forth in claim 1 hereof wherein said structure comprises a non-planar reinforcing layer comprising at least one type of layer material and at least one type of bonding material.

13. A fire-resistant bonded composite comprising a plurality of layers of at least one type of layer material, and a plurality of layers of at least one type of water-resistant phosphate bonding material obtained from the reaction of a composition comprising a metal oxide, calcium silicate and phosphoric acid, each said layer of layer material being bonded to contiguous layers of layer material by said bonding material, said bonded composite being capable of exhibiting intumescent properties when exposed to flame and/or heat.

14. The composite as set forth in claim 13 hereof wherein said metal oxide is selected from the group consisting of aluminum oxide, magnesium oxide, calcium oxide and zinc oxide, and the hydrates thereof.

15. The composite as set forth in claim 14 hereof wherein said bonding composition comprises a substantially continuous layer of material.

16. The composite as set forth in claim 14 hereof wherein said bonding composition comprises a substantially discontinuous layer of material.

17. The composite as set forth in claim 14 hereof wherein said bonded composite comprises a synthetic mica layer material.

18. The composite as set forth in claim 14 hereof wherein said bonded composite comprises a woven, a non-woven or a chopped glass layer material.

19. The composite as set forth in claim 14 hereof wherein said bonded composite comprises a woven, a non-woven or a chopped synthetic layer material.

20. The composite as set forth in claim 14 hereof wherein said bonded composite comprises a kraft paper layer material.

21. The composite as set forth in claim 14 hereof wherein said bonded composite comprises a wire mesh layer material.

22. The composite as set forth in claim 13 hereof wherein said bonding composition comprises aluminum oxide trihydrate.

23. The composite as set forth in claim 13 hereof wherein said bonding composition comprises magnesium oxide.

24. The composite as set forth in claim 13 hereof wherein said composite comprises at least one non-planar reinforcing layer comprising at least one material.

25. A process for forming a bonded composite structure, said process comprising the steps of preparing a layered composition comprising (a) at least one layer of at least one type of phosphate bonding composition comprising a metal oxide, calcium silicate and phosphoric acid, said composition being suitable to provide a water-resistant phosphate bonding material, and (b) at least one layer of at least one type of layer material, said composite being arranged such that contiguous layers of said layer material are in contact with intervening layers of said bonding composition, and curing said layered composition, optionally by subjecting it to heat and/or pressure.

26. The process as set forth in claim 25 hereof wherein said metal oxide is selected from the group consisting of aluminum oxide, magnesium oxide, calcium oxide and zinc oxide, and the hydrates thereof.

27. The process as set forth in claim 26 hereof wherein at least one of said layer materials is a synthetic mica layer material.

28. The process as set forth in claim 26 hereof wherein at least one of said layer materials is a woven, a non-woven or a chopped glass layer material.

29. The process as set forth in claim 26 hereof wherein at least one of said layer materials is a woven, a non-woven or a chopped synthetic layer material.

30. The process as set forth in claim 26 hereof wherein at least one of said layer materials is a kraft paper layer material.

31. The process as set forth in claim 26 hereof wherein at least one of said layer materials is a wire mesh layer material.

32. The process as set forth in claim 25 hereof wherein said bonding composition comprises aluminum oxide trihydrate.

33. The process as set forth in claim 25 hereof wherein said bonding composition comprises magnesium oxide.

34. The process as set forth in claim 25 hereof wherein said bonding composition is applied at a thickness of from about 1 to about 20 mils.

35. The process as set forth in claim 25 hereof wherein said bonding composition is applied as a mechanically frothed foam.

36. The process as set forth in claim 25 hereof wherein said bonding composition is applied as a substantially continuous layer of material.

37. The process as set forth in claim 25 hereof wherein said bonding composition is applied as a substantially discontinuous layer of material.

38. The process as set forth in claim 25 hereof wherein at least one layer of said layer material comprises a preformed, non-planar reinforcing layer comprising at least one type of layer material and at least one type of bonding material.

* * * * *